(12) United States Patent
Leavesley et al.

(10) Patent No.: US 9,598,046 B2
(45) Date of Patent: Mar. 21, 2017

(54) VEHICLE ASSEMBLY

(71) Applicant: Aston Martin Lagonda Limited, Warwickshire (GB)

(72) Inventors: Thomas Leavesley, Warwickshire (GB); Timothy Cowlam, Warwickshire (GB); Violaine Wigham, Warwickshire (GB)

(73) Assignee: ASTON MARTIN LAGONDA LIMITED, Gaydon (GB)

( * ) Notice: Subject to any disclaimer, the term of this patent is extended or adjusted under 35 U.S.C. 154(b) by 0 days.

(21) Appl. No.: 14/410,476

(22) PCT Filed: Jun. 24, 2013

(86) PCT No.: PCT/GB2013/051661
§ 371 (c)(1),
(2) Date: Dec. 22, 2014

(87) PCT Pub. No.: WO2014/001777
PCT Pub. Date: Jan. 3, 2014

(65) Prior Publication Data
US 2015/0336535 A1   Nov. 26, 2015

(30) Foreign Application Priority Data

Jun. 27, 2012 (GB) .................... 1211539.0

(51) Int. Cl.
*B62D 25/12*   (2006.01)
*B60R 21/34*   (2011.01)
*B62D 29/04*   (2006.01)
*B60R 21/00*   (2006.01)

(52) U.S. Cl.
CPC .............. *B60R 21/34* (2013.01); *B62D 25/12* (2013.01); *B62D 29/04* (2013.01); *B60R 2021/0048* (2013.01); *B60R 2021/343* (2013.01)

(58) Field of Classification Search
CPC .............. B60R 21/34; B60R 2021/343; B60R 2021/0048; B62D 25/12; B62D 29/04
USPC ............. 296/187.09, 187.03, 187.04, 193.11
See application file for complete search history.

(56) References Cited

U.S. PATENT DOCUMENTS

| 4,653,968 | A  | * | 3/1987 | Rapata .................... E05F 5/022 16/19 |
| 7,575,273 | B2 | * | 8/2009 | Wallman ................. B60R 21/38 180/274 |
| 7,681,685 | B2 | * | 3/2010 | Herzog .................. B60R 21/38 180/274 |

(Continued)

FOREIGN PATENT DOCUMENTS

| CN | 201784702 U | 4/2011 |
| DE | 10063582 A1 | 6/2002 |

(Continued)

*Primary Examiner* — Jason S Morrow
*Assistant Examiner* — E Turner Hicks
(74) *Attorney, Agent, or Firm* — Dorsey & Whitney LLP (57) ABSTRACT

A vehicle assembly comprising a vehicle body panel and hinge means connecting the vehicle body panel to a vehicle structure, spacing means arranged with the hinge means for maintaining at least a part of the vehicle body panel in a predetermined spacing from the vehicle structure when the hinge means is in a first position, the spacing means being configured to suffer substantially brittle failure when a predetermined load is applied thereto.

26 Claims, 3 Drawing Sheets

(56) References Cited

U.S. PATENT DOCUMENTS

| | | | |
|---|---|---|---|
| 7,690,722 B2 * | 4/2010 | Boggess | ................ B60R 21/34 296/187.04 |
| 2008/0290692 A1 | 11/2008 | Boggess | |
| 2008/0302591 A1 | 12/2008 | Herzog et al. | |
| 2009/0102239 A1 * | 4/2009 | Iwai | ........................ B60R 21/34 296/193.11 |

FOREIGN PATENT DOCUMENTS

| | | | | |
|---|---|---|---|---|
| EP | 1205366 | A1 | | 5/2002 |
| EP | 2106976 | A1 | | 10/2009 |
| GB | 2379481 | A | * 3/2003 | ............ B60R 21/34 |
| KR | 20020049355 | A | | 6/2002 |
| WO | 2008062143 | A1 | | 5/2008 |
| WO | 2010086518 | A1 | | 8/2010 |

* cited by examiner

VEHICLE ASSEMBLY

CROSS REFERENCE TO RELATED APPLICATIONS

This application is a national stage application under 35 U.S.C. §371 of International Application No. PCT/GB2013/051661 filed on Jun. 24, 2013, which claims priority to GB Patent Application No. 1211539.0 filed on Jun. 27, 2012, the contents of all of which are hereby incorporated in their entirety by reference for all purposes.

FIELD

The present invention relates to a vehicle assembly, such as for a motor car, and also a spacing component for said vehicle assembly and a motor vehicle comprising such apparatus.

BACKGROUND

Production motor vehicles are required to pass various safety tests to ensure that they are sufficiently safe for use on public roads. In particular, it is desirable that the risk of injury to pedestrians is minimised in the event of a collision between a pedestrian and a motor vehicle, for example a collision between a pedestrian and hood or bonnet or other external surface of a motor vehicle. A standard test involves impacting a 3.5 kg impactor at 35 km/h at an angle of 50 degrees to a vehicle hood to determine the head injury criterion (HIC).

Motor vehicles are generally provided with a hood or bonnet, which is used to enclose the engine bay of a vehicle. The shape of the hood or bonnet is often formed to provide the required aerodynamic performance of air over the vehicle when it is being driven. In addition, the hood or bonnet is formed in view of aesthetic considerations. In addition, the hood may be provided with one or more vents or openings to permit air flow into the engine compartment of the vehicle in order to facilitate the provision of air to the air inlet of the engine or as cooling air. In addition, the hood may be provided with one or more ribs, bulges or other means in order provide strength and rigidity to the hood and/or to provide a larger volume in the engine bay under the hood. The hood or bonnet also provides a degree of structural rigidity across the front part of the vehicle. The hood or bonnet is frequently formed of an outer skin and an inner skin which may be formed from pressed steel or any other suitable material, e.g. composites or non-ferrous metals or alloys.

For maintenance, and sometimes to access a storage area, the hood or bonnet is often connected via a hinge to the vehicle structure in order that the bonnet or hood may be opened to provide access to the engine. Many different forms of hinge arrangement are known, for example hinges which permit the hood or bonnet to pivot forward or rearward of the vehicle. Frequently, in vehicles, a four joint hinge (four bar link) is provided in order to allow the bonnet or hood of the vehicle to pivot in a predetermined manner.

The hinge arrangement used to connect the hood or bonnet to the vehicle structure is frequently made of steel and is sufficiently rigid in order to support the hood or bonnet when it is opened. In some vehicles, often due to design constraints, the hinge arrangement can be located close to the upper outer skin of the bonnet or hood of the vehicle when the hood or bonnet is in a closed position. The part of the hood in the area of the hinge may therefore be more rigid that the areas of the hood between the hinges located on either side of the hood, creating stiffer potential impact points. Some vehicles are provided with active pedestrian protection systems, where the hood of the vehicle is displaced in a direction away from the engine. However, such systems require complex control systems.

US2008/0302591 discloses a passive pedestrian-protection front hood hinge. In the front hood hinge described, a cuttable device having a cuttable member is provided. A cutting knife is also provided. A stop determines the normal closed position of the hood. When a threshold value is exceeded, the stop is adapted to be disposed downwardly beyond the normal closed position against resistance generated by the cuttable device. The resistance is caused by the cuttable member being cut in the course of displacement of the stop upon movement of the cutting knife in relation to the cuttable member. However, the cuttable member remains intact, i.e. it does not break into more than one piece. Furthermore, as the cuttable member is cuttable, it does not fully fail either through ductile or brittle failure. It is difficult to know whether the arrangement remains in optimum condition, since hard bonnet slams or persons mistreating the vehicle by applying abuse loads such as excessive force during vehicle cleaning or polishing may thus cause a partial cutting which is not easily evident and so it is difficult to know whether the optimum impact performance will be provided at any time.

WO2010/086518 discloses an arrangement where hinges are provided with parts which flex or bend before any ultimate breakage. EP1205366 describes a hinge which deforms under collision in order to absorb energy.

SUMMARY

The present invention aims to alleviate, at least to a certain extent, the problems and/or address at least to a certain extent the difficulties associated with the prior art.

According to a first aspect of the present invention, there is provided a vehicle assembly comprising a vehicle body panel and hinge means connecting the vehicle body panel to a vehicle structure, spacing (or positioning) means arranged with the hinge means for maintaining at least a part of the vehicle body panel in a predetermined spacing from (or position relative to) the vehicle structure when the hinge means is in a first position, the spacing (or positioning) means being configured to suffer substantially brittle or sudden failure when a predetermined load is applied thereto. Preferably, the vehicle body panel is an exterior body panel of a vehicle.

The spacing or positioning means may be formed from a material configured to suffer brittle fracture when the predetermined load is applied.

Advantageously, therefore, the spacing means is configured to fail or break suddenly when an impact load is applied to the vehicle body panel, such as the impact of the vehicle body panel with a pedestrian. Further, upon the failure of the spacing means, the vehicle body panel is no longer constrained in its spacing from the vehicle structure. The failure of the spacing means can serve, in part, to absorb to some degree the impact load of the object, e.g. a pedestrian, on the vehicle body structure and to permit a degree of movement of the vehicle body panel with respect to the vehicle structure thereby reducing the rigidity of the areas of the hood in the region of the hinges.

Preferably, upon failure of the spacing means, the spacing means no longer serves to space the vehicle body panel from the vehicle structure. Preferably, when intact, i.e. before failure and in normal use, the spacing means serves to maintain a localised area or point of the vehicle body part, e.g. the vehicle hood spaced from the vehicle structure. Preferably, the spacing element which snaps or breaks upon failure into two or more discrete parts. Preferably, the element only exhibits brittle failure modes over its normal operating temperature range.

Preferably, the spacing means is formed of a material which is configured to suffer substantially brittle failure at a temperature of at least 23 degrees centigrade. Preferably, the spacing means is formed of a material which is configured to suffer substantially brittle failure at a temperature of at least 50 degrees centigrade when a predetermined load is applied thereto. Preferably, the spacing means is formed of a material which is configured to suffer substantially brittle failure at a temperature of at least 70 degrees centigrade when a predetermined load is applied thereto. Preferably, the spacing means is formed of a material which is configured to suffer substantially brittle failure at any point over a temperature range of −30 to 70 degrees centigrade when a predetermined load is applied thereto.

Preferably, the spacing means is formed of a semi-crystalline or crystalline material. Such a material may undergo failure through rapid crack propagation, without significant deformation or yielding.

Preferably, the spacing means is formed of a material which is substantially resistant to the ingress of moisture. Advantageously, such a material serves to ensure substantially constant material properties during the life of the spacing means.

Preferably, the spacing means comprises a plastics material.

Preferably, the spacing means is configured to suffer substantially brittle failure only when a load of greater than 500N, or more preferably greater than 600N, or more preferably greater than 750N or more preferably greater than 1000N is applied to the vehicle body panel or spacing means. Preferably, the spacing means is configured to suffer substantially brittle failure when the load is applied in the region of the hinge or substantially over or in line with the spacing means. Advantageously, the spacing means can withstand the forces applied to the vehicle body panel during use, i.e. the repeated opening and closing of the vehicle body part, e.g. a hood or a vehicle and other higher loads, e.g. "abuse" loads which may be applied, for example during vehicle maintenance, e.g. washing of the vehicle.

Preferably, the spacing means is configured to suffer substantially brittle failure, when an initiation load of more than 1500 kN is applied to the vehicle body panel or spacing means. Advantageously, configuring the spacing means to fail only above a predetermined load seeks to ensure that the spacing means is not damaged or fails during normal use of the hood or vehicle.

A typical impact load of a pedestrian can be in the order of 2-3 kN or more for a period of 3 ms.

Preferably, the spacing means comprises a polymer material.

Preferably, the spacing means comprises polybutylene terephthalate (PBT). The material is also known as Poly (oxy-1,2-butanediyloxycarbonyl-1,4-phenylenecarbonyl). Advantageously, such a material may be formed without shrinkage, is heat resistant up to 150° C. and more preferably 200° C. with the inclusion of glass fibre. The material is substantially resistant to solvents. The molecular formula of polybutylene terephthalate is $(C_{12}H_{12}O_4)_n$, where n>10. Preferably n>1000 or 10000.

Preferably, the polybutylene terephthalate is reinforced with glass-fibre. Advantageously, the use of glass-fibre increases the resistance of the material to yielding. Preferably, the material exhibits little or substantially no yielding. Preferably, the tensile strain of the material of the spacing means at break is less than or equal to 5%, more preferably less than 3%, or more preferably, less than or equal to 2.5%. Preferably, the tensile strain at break of the material of the spacing means is unchanged in wet conditions.

Preferably, the tensile modulus of the material of the spacing means is between 5 GPa and 15 GPa, more preferably, between 7.5 GPa and 12.5 GPa, or more preferably, between 10 GPa and 12 GPa. Preferably, the tensile modulus of the material of the spacing means is 10.3 GPa or 10.5 GPa. Preferably, the tensile modulus is substantially unchanged in wet conditions.

Preferably, the tensile stress at break of the material of the spacing means is between 100 to 200 MPa, more preferably, between 125 and 175 MPa, or more preferably, between 140 and 155 MPa. Preferably, the tensile stress at break of the material of the spacing means is 150 MPa or 145 MPa.

Preferably, the equilibrium moisture content of the material of the spacing means is between 0 and 0.5%, or more preferably, between 0 and 0.25%. Preferably, the equilibrium moisture content of the material of the spacing means is 0.15% or 0.20%.

Preferably, the density of the material of the spacing means is between 1 g/ml and 2 g/ml, or more preferably between 1.5 g/ml and 1.55 g/ml. Preferably, the density of the material of the spacing means is 1.55 or 1.52 g/ml.

Preferably, the difference in heat distortion temperature of the material of the spacing means is less than 10% at a load of 1.8 MPa and at a load of 0.45 MPa. Preferably, the heat distortion temperature at a load of 1.8 MPa is greater than 190 degrees centigrade, more preferably greater than or equal to 200 degrees centigrade. Preferably, the heat distortion temperature at a load of 1.8 MPa is less than 230 degrees centigrade, more preferably, less than 220 degrees centigrade. Preferably, the heat distortion temperature at a load of 1.8 MPa is 210 or 202 degrees centigrade.

Preferably, the heat distortion temperature at a load of 0.45 MPa is greater than 190 degrees centigrade, more preferably greater than 200 degrees centigrade, more preferably greater than 210 degrees centigrade. Preferably, the heat distortion temperature at a load of 0.45 MPa is less than 250 degrees centigrade, more preferably, less than 230 degrees centigrade. Preferably, the heat distortion temperature at a load of 1.8 MPa is 225 or 220 degrees centigrade.

Preferably the tensile creep modulus (1 hr/1000 hrs) of the material of the spacing means is less than 15 GPa/15 GPa, more preferably, less than 10 GPa/10 GPa, more preferably 9.2 GPa/6.5 GPa. Preferably, the tensile creep module (1 hr/1000 hrs) is greater than 9 GPa/6 GPa.

Preferably, a Charpy impact test of the material of the spacing means shows a variation of less than 10% or more preferably less than 1% across a temperature range of −30 to 23 degrees centigrade. Preferably, at 23 and −30 degrees centigrade, the material of the spacing means exhibits a Charpy impact value ($kJ/m^2$) of less than 75 when unnotched, more preferably less than 65 when unnotched, or more preferably, less than or equal to 9.5 or 9.0 when unnotched.

Preferably, the polybutylene terephthalate is filled with 25 to 40% glass fibre. More preferably, the polybutylene terephthalate is filled with 30 to 35% glass fibre and more preferably with 30% glass fibre. Preferably, the polybutylene terephthalate comprises nominally 30% glass fibre. Preferably, the polybutylene terephthalate comprises 27% to 33% glass fibre. Advantageously, the material can exhibit substantially constant failure modes between −30 and 70 degrees centigrade.

Preferably, the vehicle assembly is arranged and the spacing means is formed of a material which is configured, in use, to reduce the peak head acceleration during an impact by between 30-40% or more.

Although preferred ranges of the material properties have been identified, it will be understood that a degree of variability exists both in the material properties and the result vehicle assembly due to their method of manufacture or assembly.

Preferably, the spacing means is adjustable to permit adjustment of the spacing of the vehicle body panel from the vehicle structure when the hinge means or hinge is in said first position. Advantageously, the spacing means can be adjusted to adjust the panel alignment between the vehicle body part, e.g. a hood of a vehicle, and a fender or wing of a vehicle.

Preferably, the spacing means is formed with a threaded interface for connection with the hinge means. Advantageously, the threaded surface, e.g. a screw thread, permits a fine degree of adjustment.

Preferably, the spacing means is formed as a bolt or screw. Preferably, the screw may be formed with a hexagonal end for connecting with a correspondingly formed tool. Preferably, a locking nut is used to fix the position of the screw.

The vehicle body part may comprise a hood or bonnet of a vehicle. Preferably, a similar hinge means or hinge is provided on either side of the hood. Preferably, the hinge means or hinge is a four point hinge. Depending on the vehicle body part, the hinge means may be any suitable hinge. In addition to a freely pivoting hinge, the hinge means may also refer to a fixedly connected joint between the vehicle body part and the vehicle structure, but configured, for example with a line of weakness, about which the vehicle body part may rotate.

Preferably, the vehicle body part is a tailgate, boot lid, trunk lid or door of a vehicle. Advantageously, the invention may be applied to any moveable part of the vehicle which may suffer an impact, for example, during an accident.

Preferably, the first position of the hinge provides or is a closed position of the vehicle body panel. In the example of a vehicle hood or bonnet, the closed position of the hood is when the hood is in substantially flush alignment with adjacent body parts. The hood may be hinged towards its rear edge, i.e. the edge furthest away from the front end of the vehicle or near its front edge, depending on the design of the vehicle. A lock or catch may be provided towards the edge which is not hinged. The hinge may be provided with gas pistons or other means to support the weight of the vehicle body panel when it is open.

Preferably, in the first position of the hinge means or vehicle body panel, the spacing means is orientated with its longitudinal axis substantially perpendicular to a tangent to the vehicle body panel. Advantageously, the spacing means is subject, during an impact with the vehicle body part, to a substantially compressive load along the longitudinal axis of the spacing means. Preferably, the spacing means is subject to a bending load during impact. Preferably, the spacing means is subject and/or fails when subjected to a combination of compressive and bending loads.

The spacing means may be an elongate member, such as a screw, which may be fixed or adjustably fixed to a member of the hinge or body part, such as a flange, which may be configured to apply a bending moment to the elongate member (preferably as well as compressive axial load) during impact. The member, e.g. flange, may be orientated at about 90 degrees to the longitudinal direction of the elongate member and may apply a twisting or bending to the elongate member during impact due to compliance in at least one of the flange, the hinge and the body panel.

Preferably, the spacing means is arranged offset, but preferably substantially parallel, to a plane of rotation of the hinge. The offset arrangement can also impart tension to the hinge when the vehicle body part is in a closed position so as to help reduce flutter and lift of the vehicle body part.

Preferably, the hinge means or hinge permits movement of the vehicle body part with respect to the vehicle structure.

According to a further aspect of the present invention, there is provided a spacing means for a vehicle assembly substantially as claimed in any one of the preceding claims. The spacing means may include any of the features of the spacing means described in relation to the first aspect of the invention.

The spacing means of the above aspects may alternatively be referred to as a positioning means.

A further aspect of the invention provides a vehicle, such as a motor car, which includes an assembly or spacing means in accordance with one or more above aspects of the invention. The body part may comprise any of the body parts mentioned above such as a front hood for covering an engine bay and/or a storage or luggage area of the vehicle.

BRIEF DESCRIPTION OF THE DRAWINGS

The present invention may be carried out in a various way and embodiments of the invention will now be described by way of example with reference to the accompanying drawings in which.

DETAILED DESCRIPTION

Figure 1:
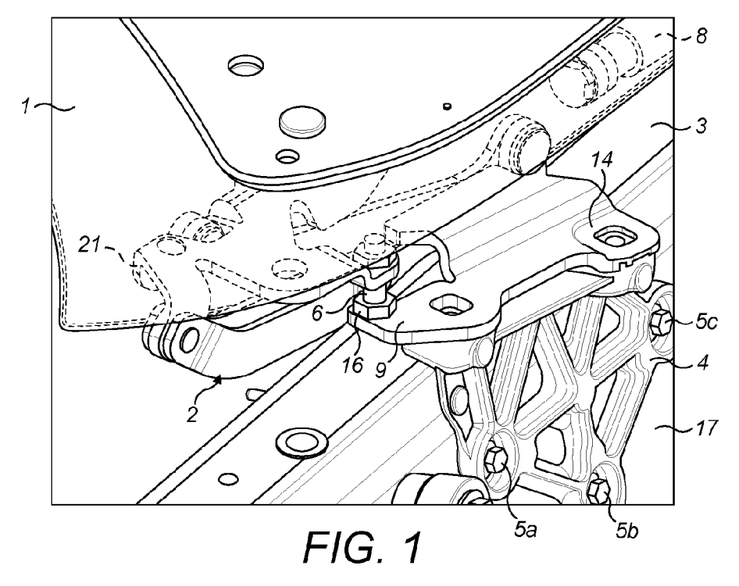
FIG. 1 shows a perspective view of a vehicle assembly showing a vehicle hood in a closed position.

FIG. 1 shows a perspective view of a vehicle assembly showing a vehicle hood in a closed position with respect to the vehicle structure. The vehicle hood 1 is attached to the upper part 21 of a hinge 2. In the embodiment, the hinge 2 is a four joint hinge. Linking members 22a, 22b connect the upper part 21 of the hinge to a hinge base 18. The hinge base 18 is connected to a lattice shaped hinge bracket 4. The lattice shaped bracket 4 is connected to a vehicle structure, which, in the embodiment, is a fender 17 of the vehicle. The lattice bracket 4 is connected to the fender 17 of the vehicle using connecting bolts 5a, 5b. The upper part of the hinge 21 is provided with a flange 19. In the closed position of the vehicle hood, the flange 19 extends in a plane which is substantially parallel with the vehicle hood 1.

Figure 2:
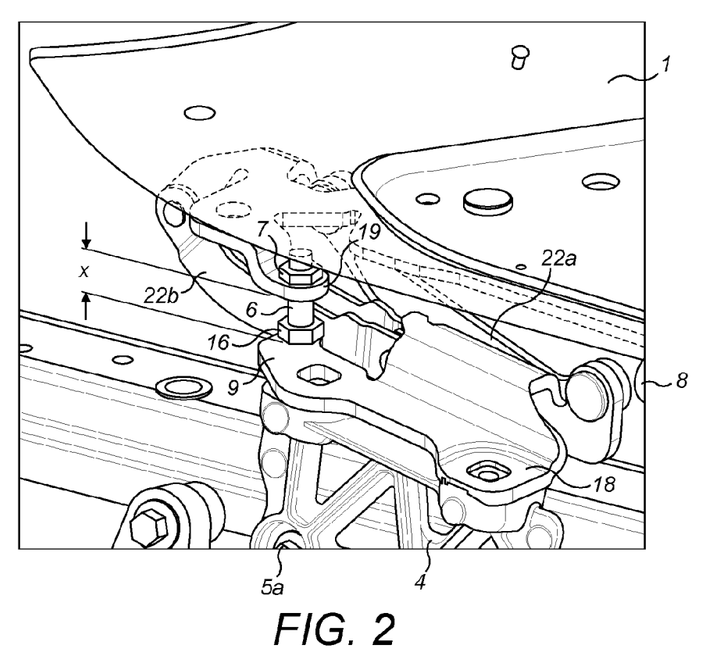
FIG. 2 shows a side view of a vehicle assembly showing the hood in a closed position.

As shown in FIGS. 1 and 2, the hinge 2 is provided with a supporting piston 8, such as a gas piston, which may be configured to control the rate at which the bonnet is raised and lowered and to provide support to the bonnet 1 when in an open position.

The hinge base 18 is positioned over an edge 3 of the fender 17.

The flange 19 of the hinge 2 is provided with a threaded hole. In the threaded hole a spacing element 6 is located. The spacing element is in the form of a screw or bolt 6 provided with an external thread. The screw or bolt 6 is connected to the flange 19 of the hinge 2 by being screwed through the hole in the flange 19. The screw or bolt has a thread along its length and the position of the bolt may be adjusted by screwing the thread further into or out of the flange 19. In order to lock the position of the screw in the flange 19, a lock nut 7 is provided on the uppermost side of the flange 19 to engage with the thread of the screw 6.

At the distal end of the screw 6, i.e. the end furthest from the vehicle hood 1, a screw head 16, in the embodiment in the form of a hexagonal screw head, is provided. The screw 6 may be adjusted by using a tool in order to rotate the head 16 of the screw 6.

When the vehicle bonnet 1 is in a closed position, the head 16 of the screw 6 is located and rests atop the hinge base 18 on a part thereof formed as a substantially planar platform 9.

The screw 6 may be adjusted by turning the head 16 in order to adjust the spacing of the vehicle body panel, in the embodiment the bonnet 1, from the vehicle structure, in the embodiment the edge of fender 12. As shown in FIG. 2, the screw 6 has been adjusted to provide a spacing x between the hinge flange 19 and the hinge base 18. Without the screw 6, the hinge 2 would be permitted to over-pivot such with the hinge flange 19 and the hood 1 would be permitted to move in closer proximity to the hinge base 18. In such a situation, the hood 1 of the vehicle would no longer lie in alignment with the outer skin of the fender or wing (not shown in FIGS. 1 and 2).

Figure 3A:
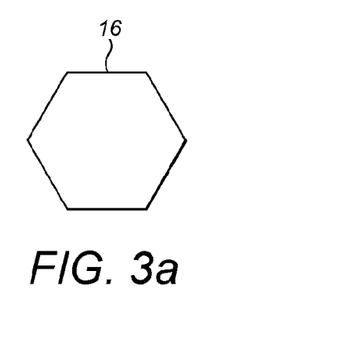
FIGS. 3a and 3b shows an end view and side view of a screw for adjusting the spacing of the vehicle hood from the vehicle structure.
Figure 3B:
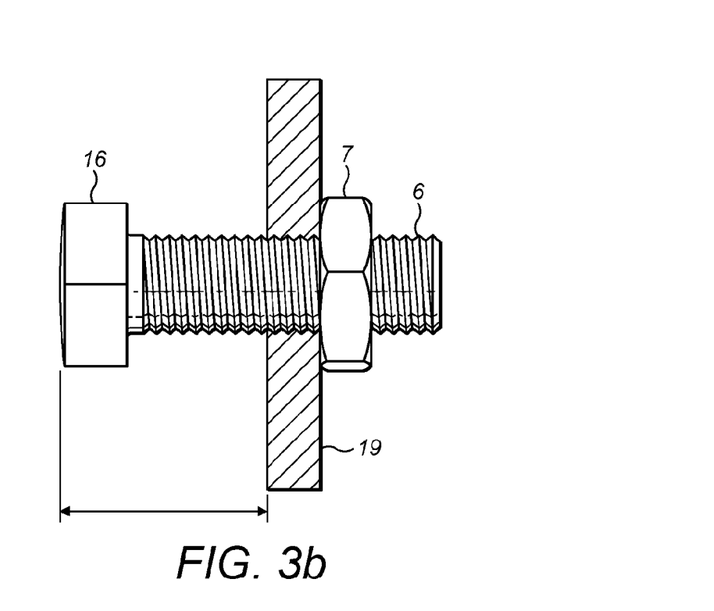

FIG. 3a shows the end of the head 16 of the screw 6, which in the embodiment, is a hexagonal head. In the embodiment, the screw is an M8 screw with a length of 25 mm. FIG. 3b shows in further detail the spacing means in the form of a bolt 6. The spacing means 6 is attached to the flange 19 of the hinge 2. A locking nut 7 is used in order to maintain the spacing or position of the head 16 at the distal end of the screw 6 from the flange 19. The flange 19 is provided with a threaded hole to engage with the thread provided on the outer surface of the screw 6.

Figure 4:
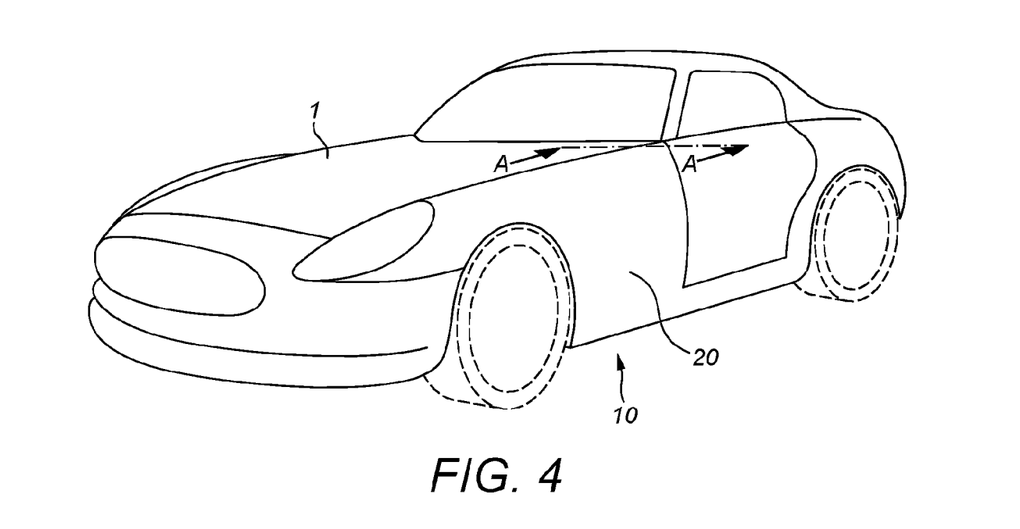
FIG. 4 shows a perspective view of the exterior of a vehicle.

FIG. 4 shows an external view of a vehicle 10. The vehicle 10 includes a hood 1 and a fender or wing 20. FIG. 4 shows the hood 1 in a closed position. In the closed position of the hood 1, the hood 1 is substantially aligned or flush with the surface of the fender or wing 20.

Figure 5:
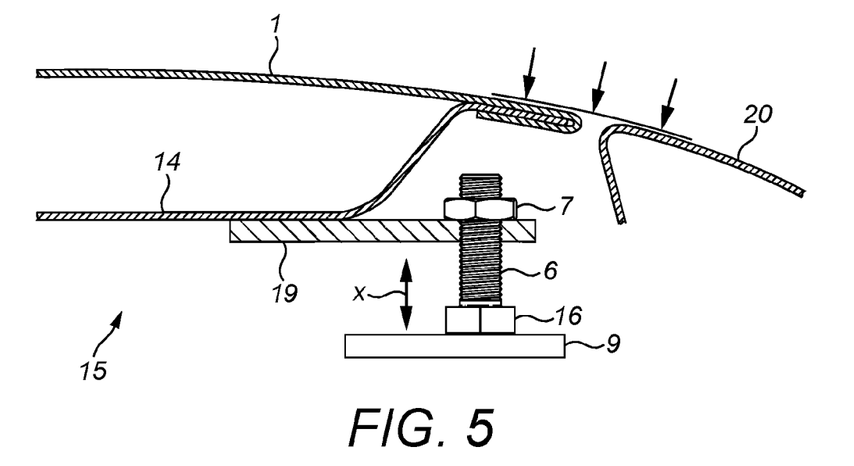
FIG. 5 shows a cross section through A-A of FIG. 4 showing the vehicle hood in a closed position.

FIG. 5 shows a cross section through A-A of FIG. 4 in a plane substantially perpendicular to the outer surface of the hood 1. The hood 1 comprises an outer skin 1 and an inner skin 14. In the embodiment, the outer skin 1 and the inner skin 14 of the bonnet are connected along their edges. The inner and outer skin 1, 14 may be formed of steel or any suitable material, for example composite materials such as carbon fibre.

To the inner skin 14, the flange 19 of the upper part of the hinge 2 is connected. In the flange 19 of the hinge 2, a threaded hole is provided through which the screw 6 is positioned. A locking nut 7 maintains the screw 6 in a predetermined position relative to the flange 19 of the hinge 2. The head 16 of the screw 6 is located and rests upon the platform 9 of the hinge 2.

FIG. 5 shows the hood in a closed position. In the closed position of the hood 1, the hood outer skin 1 is in substantially continuous alignment with the outer skin 20 of the outer skin of the fender or wing of the vehicle. Below the inner skin of the hood 14, an engine cavity 15 is provided. The adjustment of the screw 6 in the flange 19 permits the relative spacing of the hood 1 from the vehicle structure 17 to be changed. In the embodiment, the spacing x may be adjusted by +/−3.0 mm. When the hood is opened, the screw moves with the flange 19 of the hinge 2.

Figure 6:
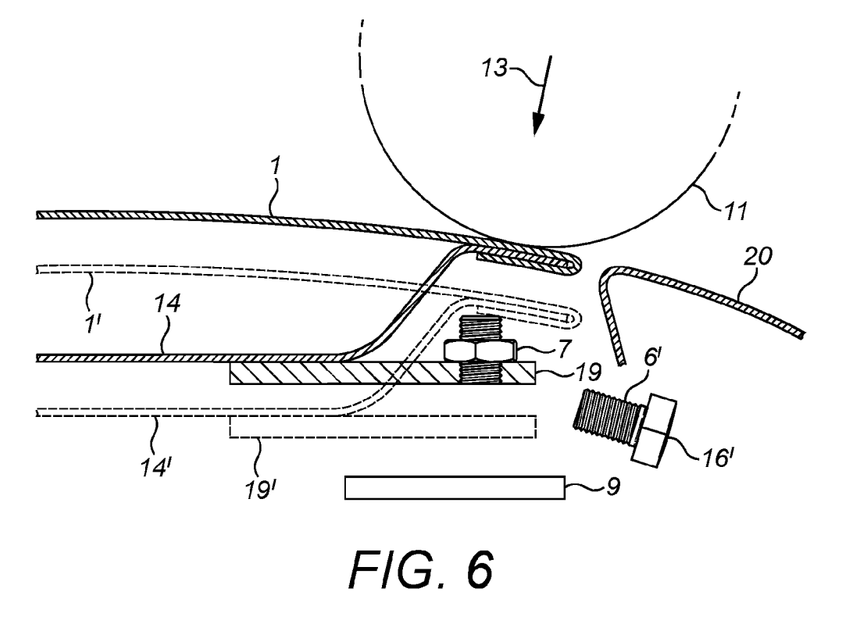
FIG. 6 shows a cross section through A-A of FIG. 4 showing the hood of the vehicle being impacted, with the displaced position of the bonnet being shown by dashed lines.

FIG. 6 shows schematically the impact of an object 11, for example a head of a pedestrian, which impacts the vehicle in a direction 13. The screw 6 is arranged with its longitudinal axis substantially perpendicular to a tangential plane to the outer skin 1 of the hood. In the embodiment, the screw 6 is formed as an M8 hexagonal head screw with a length of 25 mm. The screw is formed of polybutylene terephthalate (PBT). In the embodiment, the PBT material is filled with 30% glass fibre. The material, in the embodiment, exhibits substantially no yield. Examples of the properties of typical suitable polybutylene terephthalate materials are provided in Table 1.

TABLE 1

| | | | MATERIAL | |
| --- | --- | --- | --- | --- |
| | | | PBT GP injection moulded | PBT GP |
| | | | glass fibre content | |
| | | | 30% GF | 30% GF |
| Density | g/ml | | 1.55 | 1.52 |
| Equilibrium moisture content | % | | 0.15% | 0.20% |
| Tensile stress at Yield | MPa | Dry | no yield | no yield |
| Tensile strain at Yield | % | Dry | no yield | no yield |
| Tensile stress at Break | MPa | Dry | 150 | 145 |
| Tensile strain at Break | % | Dry | 2.5 | 2.4 |
| Tensile Modulus | GPa | Dry | 10.3 | 10.5 |
| Tensile Creep Modulus (1 hr/ 1000 hrs) | GPa | Dry | 9.2/6.5 | |
| Charpy Impact @ 23° C. | kJ/m2 | Dry N/uN | 9.5/60 | 8/55 |
| Charpy Impact @ −30° C. | kJ/m2 | Dry N/uN | 9.0/60 | |
| Heat Distortion Temperature | ° C. ° C. | 1.8 MPa 0.45 MPa | 210 225 | 202 220 |

The material referred to as "GP (general purpose) injection moulded" shown in Table 1 may, for example, be Ticona Celanex 2300 GV1/30 PBT Glass Reinforced compound (Chemical abbreviation according to ISO 1043-1: PBT Moulding compound ISO 7792-PBT, MGHR, 08-100N, GF30 Polybutylene terephthalate, 30% glass fibre reinforced).

Upon impact of the object 11 with the outer skin 1 of the vehicle hood, the screw 6 is subjected to a substantially axial compressive load. The screw 6 is also subjected to a degree of flexural loading, which may be accomplished by compliance in the nearby structure of nearby components of the hood 1 and/or flange 19. In the embodiment, the screw 6 is configured to undergo a brittle failure mode when it, or the bonnet in the region of the hinge is subjected to a load above 1500N and at least below 4000N. When the screw 6 fails, the screw 6 snaps or breaks as shown by dashed lines 6' and 16' and no longer provides a spacing between the flange 19 (19' in dashed lines shows the displaced position of the flange) of the hinge 2 and the lower part 9 of the hinge. In this way, the hinge 2 is permitted to over-pivot such that the hood 1 may be displaced by the impact of the object 11. The displacement of the hood is shown by the dashed lines 1' and 14'. During an impact, for example a head impact with the bonnet, the bonnet skin absorbs a degree of the head impact and also transferred the load locally into the hinge. With the failure of the spacing means, a localised hard-point is removed and the additional displacement or movement of the bonnet (approximately around 50-60 mm or more) with respect to the hinge increases the energy absorption ability of the bonnet.

The location of the screw 6 in the flange 19 of the hinge 2 at an end thereof, in a plane offset, but substantially parallel, from the plane of rotation of the hinge linkages, further results in a degree of elastic bending by the screw 6 of the flange 19 upon loading. In the closed position, this offset provides tension to the hinge and reduces flutter of the hood or lid in its closed position when the vehicle is travelling.

The material of the screw 6 is designed to withstand normal service loads of the hood, for example the closing of the hood with a force of approximately 600N and with so-called "abuse" loads applied to the hood, for example during washing or maintenance of the vehicle, of around 1000N.

Although only one screw 6 has been shown in the Figures, a similar hinge and screw arrangement is provided on either sides of the hood 1 of the vehicle on opposite sides of the vehicle.

The material of the screw 6 is chosen to show low creep, i.e. a low tensile creep modulus, such that the properties of material remain substantially unchanged over the operating temperature range and lifetime of the product. The material is also chosen such that it is resistant to corrosion and the absorption of moisture.

At lower temperatures, for example at −35° C., the maximum loading before brittle failure of the screw 6 is in the order of 3700N. Experimental tests of spacing means formed of polybutylene terephthalate with 35% glass fibre filling as an M8×25 mm screw are shown in Table 2 below. The screws are pre-conditioned at the test temperature for 3 hours before testing. In the tests, the loads applied are either purely compression or flexural. However, with the arrangement of the spacing means in the assembly and the configuration of the material properties, a combination of such loads during a typical impact of the spacing means, seeks, in use, to ensure that the failure load falls within the preferred ranges.

TABLE 2

| Sample | Test Type & temperature | Max Load (N) | Average load (N) |
|---|---|---|---|
| 1 | Compression load at 23° C. | 2582 | 2412 |
| 2 | | 2344 | |

TABLE 2-continued

| Sample | Test Type & temperature | Max Load (N) | Average load (N) |
|---|---|---|---|
| 3 | | 2310 | |
| 4 | Compression load at −35° C. | 3835 | 3736 |
| 5 | | 3717 | |
| 6 | | 3655 | |
| 7 | Compression load at +100° C. | 1345 | 1329 |
| 8 | | 1270 | |
| 9 | | 1371 | |
| 10 Lock nut | Flexural load at 23° C. | 154 | 153 |
| 11 No lock nut | | 153 | |
| 12 Lock nut | Flexural load at −35° C. | 151 | 151 |
| 13 Lock nut | | 152 | |
| 14 No Lock nut | | 151 | |
| 15 Lock nut | Flexural load at +100° C. | 152 | 151 |
| 16 No lock nut | | 151 | |

As can be seen from Table 2, when the spacing means in the form of the screw was subjected to a compressive loading at 23 degrees centigrade, screws in a batch of such screws made to the same specification failed with an average maximum load of 2412N. When the spacing means in the form of the screw was subjected to a compressive loading at −35 degrees centigrade, screws in the batch failed with an average maximum load of 3736N. When the spacing means in the form of the screw was subjected to a compressive loading at 100 degrees centigrade, screws in the batch failed with an average maximum load of 1329N. The flexural strength of the spacing means is also shown in Table 2, both with and without a lock nut present. When subjected to a flexural load, i.e. a load at its distal end perpendicular to the longitudinal axis of the screw, at 23, −35 and 100 degrees centigrade, the screws in the batch failed with an average load of 153N, 151N and 151N respectively.

Although in the embodiments described, the vehicle body part is described as a hood, the vehicle body part could be any vehicle body part provided with a hinge, such as a door or tailgate.

The present invention may be carried out in various ways and various modifications are envisaged to the embodiments described without extending outside the scope of the invention as defined in the accompanying claims.

The invention claimed is:

1. A vehicle assembly comprising a vehicle body panel and hinge connecting the vehicle body panel to a vehicle structure, a spacing member arranged with the hinge for maintaining at least a part of the vehicle body panel in a predetermined spacing from the vehicle structure when the hinge is in a first position, the spacing member being configured to suffer substantially brittle failure and breaks into two or more discrete parts when a predetermined load is applied thereto.

2. A vehicle assembly according to claim 1, wherein the spacing member is formed from a material configured to suffer brittle fracture when the predetermined load is applied.

3. A vehicle assembly according to claim 1, wherein the spacing member is formed of a semi-crystalline or crystalline material.

4. A vehicle assembly according to claim 1, wherein the spacing member is formed of a material which is substantially resistant to the ingress of moisture.

5. A vehicle assembly according to claim 1, wherein the spacing member comprises a plastics material.

6. A vehicle assembly according to claim 1, wherein the spacing member is configured to suffer substantially brittle failure only when a load of greater than 1000N is applied to the vehicle body panel.

7. A vehicle assembly according to claim 1, wherein the spacing member is configured to suffer substantially brittle failure only when a load of greater than 1500N is applied to the vehicle body panel.

8. A vehicle assembly according to claim 1, wherein the spacing member is configured to suffer substantially brittle failure when a load of less than 4000N is applied to the vehicle body panel.

9. A vehicle assembly according to claim 1, wherein the spacing member is configured to suffer substantially brittle failure at a temperature of up to at least 23 degrees centigrade when the predetermined load is applied thereto.

10. A vehicle assembly according to claim 1, wherein the spacing member is formed of a material which is configured to suffer substantially brittle failure over a temperature range of −30 to 70 degrees centigrade when the predetermined load is applied thereto.

11. A vehicle assembly according to claim 1, wherein the spacing member comprises a polymer material.

12. A vehicle assembly according to claim 1, wherein the spacing member comprises polybutylene terephthalate.

13. A vehicle assembly according to claim 12, wherein the polybutylene terephthalate is reinforced with glass fibre.

14. A vehicle assembly according to claim 13, wherein the polybutylene terephthalate comprises 30 to 35% glass fibre.

15. A vehicle assembly according to claim 1, wherein the spacing member is adjustable to permit adjustment of the spacing of the vehicle body panel from the vehicle structure when the hinge is in the first position.

16. A vehicle assembly according to claim 1, wherein the spacing member is formed with a threaded interface for connection with the hinge.

17. A vehicle assembly according to claim 1, wherein the spacing member is formed as a bolt or screw.

18. A vehicle assembly according to claim 1, wherein the vehicle body panel is a hood or bonnet of a vehicle.

19. A vehicle assembly according to claim 1, wherein the vehicle body panel is a tailgate or door of a vehicle.

20. A vehicle assembly according to claim 1, wherein the first position of the hinge provides or is a closed position of the vehicle body panel.

21. A vehicle assembly according to claim 1, wherein in the first position of the hinge, the spacing member is orientated with its longitudinal axis substantially perpendicular to a tangent to the vehicle body panel.

22. A vehicle assembly according to claim 1, wherein the spacing member is arranged offset from a plane of rotation of the hinge.

23. A vehicle assembly according to claim 1, wherein the hinge permits movement of the vehicle body panel with respect to the vehicle structure.

24. A spacing member for a vehicle assembly as claimed in claim 1.

25. A motor vehicle, which includes a vehicle assembly as claimed in claim 1.

26. A vehicle assembly according to claim 1, wherein the spacing member is elongate and is configured to suffer substantially brittle failure along its length when the predetermined load is applied thereto.

* * * * *